United States Patent
Steudler, Jr. et al.

(10) Patent No.: US 9,392,772 B2
(45) Date of Patent: Jul. 19, 2016

(54) POULTRY FEEDER STORAGE SYSTEM

(71) Applicant: Valco Companies, Inc., New Holland, PA (US)

(72) Inventors: Frederick W. Steudler, Jr., Conestoga, PA (US); Philip E. Risser, Leola, PA (US); Daniel B. Truong, Lancaster, PA (US); Amos Glen Fowler, Denver, PA (US)

(73) Assignee: Valco Companies, Inc., New Holland, PA (US)

( * ) Notice: Subject to any disclaimer, the term of this patent is extended or adjusted under 35 U.S.C. 154(b) by 183 days.

(21) Appl. No.: 14/504,058

(22) Filed: Oct. 1, 2014

(65) Prior Publication Data

US 2016/0095300 A1    Apr. 7, 2016

(51) Int. Cl.
    *A01K 39/00* (2006.01)
    *A01K 39/01* (2006.01)
    *A01K 5/02* (2006.01)

(52) U.S. Cl.
    CPC ............... *A01K 39/01* (2013.01); *A01K 5/0208* (2013.01)

(58) Field of Classification Search
    CPC .. A01K 39/01; A01K 5/0208; A01K 39/0125
    USPC ....................................................... 119/51.01
    See application file for complete search history.

(56) References Cited

U.S. PATENT DOCUMENTS

| | | | |
|---|---|---|---|
| 2,786,447 A * | 3/1957 | Murray | A01K 39/01 119/57.6 |
| 3,033,163 A | 5/1962 | Hostetler et al. | |
| 3,230,933 A | 1/1966 | Myers et al. | |
| 3,415,228 A | 12/1968 | Myers | |
| 3,598,087 A | 8/1971 | Ramser | |
| 3,971,340 A | 7/1976 | Allen | |
| 4,003,339 A | 1/1977 | Hostetler | |
| 4,070,990 A | 1/1978 | Swartzendruber | |
| 4,476,811 A | 10/1984 | Swartzendruber | |
| 5,007,380 A | 4/1991 | Badia et al. | |
| 5,406,907 A * | 4/1995 | Hart | A01K 39/0125 119/53 |
| 5,961,856 A | 10/1999 | Fusaro, Jr. et al. | |
| 6,655,317 B1 | 12/2003 | Steudler, Jr. et al. | |
| 7,040,250 B2 * | 5/2006 | Cole | A01K 39/0125 119/53 |
| 7,107,932 B2 * | 9/2006 | Cole | A01K 39/0125 119/51.01 |
| 7,552,697 B2 * | 6/2009 | Busse | A01K 39/0125 119/51.01 |
| 7,587,990 B2 * | 9/2009 | Cole | A01K 39/0125 119/52.1 |
| D750,848 S * | 3/2016 | Risser | A01K 39/0125 D30/129 |
| 2004/0025796 A1 * | 2/2004 | Cole | A01K 39/0125 119/55 |
| 2016/0021853 A1 * | 1/2016 | Septien Prieto | A01K 39/0125 119/52.1 |
| 2016/0073615 A1 * | 3/2016 | Van Kerrebroeck | A01K 39/0125 134/22.12 |

\* cited by examiner

*Primary Examiner* — Kristen C Hayes
(74) *Attorney, Agent, or Firm* — Duane Morris LLP

(57) ABSTRACT

A poultry feed system is provided having a plurality of feeders that may be fully charged with feed while located on the floor of the feed house, but are capable of being stored near to their location when feeding has ceased.

19 Claims, 21 Drawing Sheets

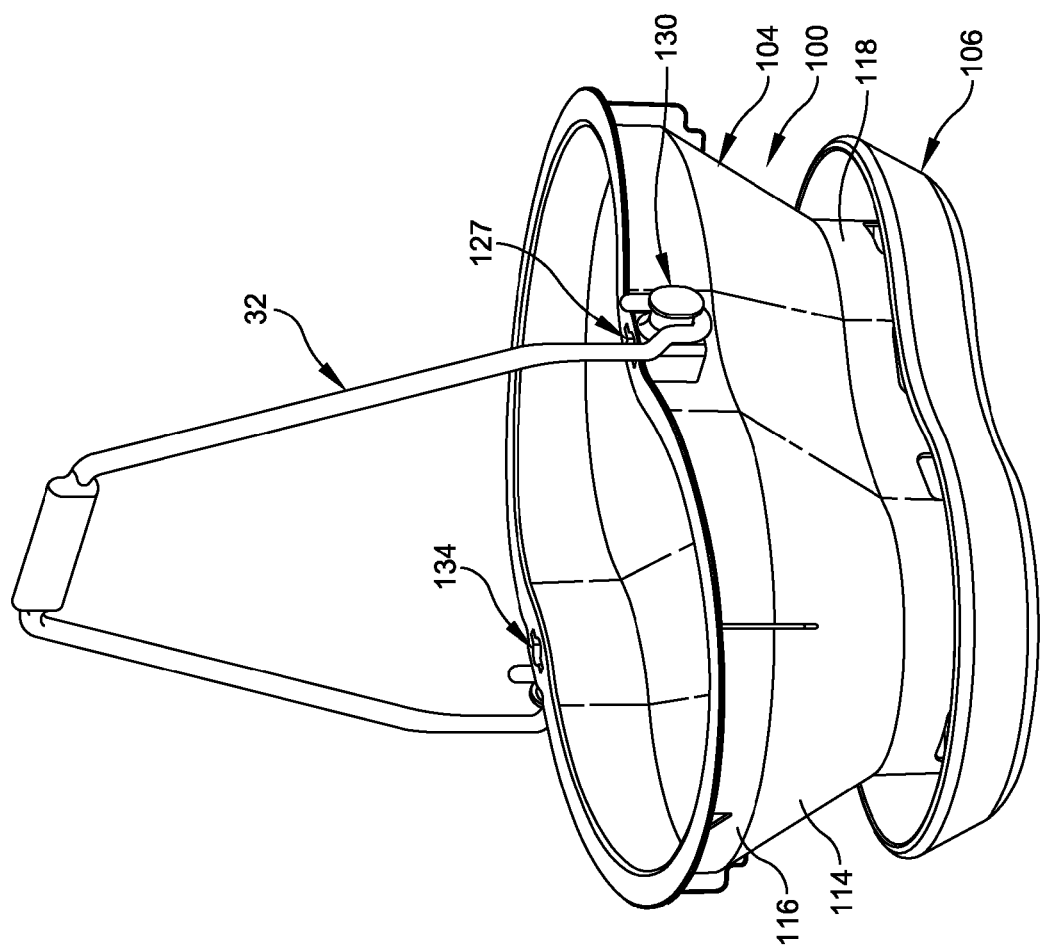

POULTRY FEEDER STORAGE SYSTEM

FIELD OF THE INVENTION

The invention generally relates to the field of feeder systems used for feeding poultry, and more specifically poultry feeders that dispense feed to birds.

BACKGROUND OF THE INVENTION

A typical poultry house is long structure that may have a length of several hundred feet, a width of about 40-60 feet, and may house about 15,000-20,000 birds. Poultry houses are often equipped with an automated feeding system consisting of one or more feed delivery lines which run the length of the poultry house. Among the important parts of such feeding systems for poultry are the feeder pans or pan assemblies. These feeder pans receive feed flowing from system conveyors or like mechanisms, and are disposed within a poultry house so as to afford the poultry ready access to the feed they contain. Some of these devices include, in general, a pan for receiving and disposing feed for access by the poultry, and a hood overlying the pan which accepts feed from a conveyor or like delivery device. Usually, the pan is suspended at a position spaced below the feed conveyor system, but, in some instances the feed pan is located on the floor of the feed house. It is a labor intensive process to walk the floor based feeder pans to the appropriate locations within a commercial feed house, raising the need for labor and increasing costs. In addition, over time the feeder pans become soiled with bird excrement, thus requiring regular cleanings.

Poultry feedings systems of the pan-type are well-known in the art. Examples of such feeding systems and feeders used in them are disclosed in U.S. Pat. Nos. 6,655,317; 5,007,380; 4,476,811; 4,003,339; 3,971,340; 3,598,087; 3,415,228; 3,230,933; and 3,033,163; which are incorporated herein by reference in their entireties. As generally disclosed in these various patents, feed from an bulk feed storage tank located outside of the poultry house is conveyed and discharged into one or more feed hoppers or similar distributed receptacles that may be located inside the house.

An improved poultry feed system is desired that allows the system and individual poultry feeder units to be fully filled or charged with feed while residing on the floor of the feed house, while having the ability to be stored on location, but without providing a perch for the birds. It is also desirable that the feeding system from which the poultry can obtain feed be arranged so as to discourage the poultry from perching on top of the device and spoiling the feed with excrement.

SUMMARY OF THE INVENTION

The invention provides a poultry feed system having a plurality of feeders that advantageously may be fully charged with feed while located on the floor of the feed house, but are capable of being stored near to their location when feeding has ceased. In one embodiment, a poultry feeder storage system is provided that includes feed conveyor tube and at least one feeder. Each feeder includes a pan rotatingly assembled to a radially resilient bin, with the bin including a plurality of latches located in circumferentially spaced relation to one another on an edge of the bin. At least two receiver collars are fastened around the feed conveyor tube in longitudinally spaced-apart relation to one another such that the radially resilient bin may be (i) deformed radially inwardly so that at least two opposing latches are arranged so as to be releaseably coupled to the receiver collars, and (ii) released so as to spring outwardly thereby causing the latches to engage the receiver collars.

In another embodiment, a poultry feeder storage system is provided that includes a feed conveyor tube and at least one feeder. Each feeder includes a pan assembled to a bin where the bin and the pan have a figure eight cross-sectional profile so as to define a central waist. Two latch-locks are located in circumferentially spaced relation to one another on an edge of the central waist of the bin, with each of the latch-locks comprising a key hole. At least two receiver collars are fastened in longitudinally spaced-apart relation to one another around the feed conveyor tube. Each receiver collar including of a key projecting upwardly relative to the feed conveyor tube such that the bin may be (i) positioned atop the at least two receiver collars so that the key is located within the key hole.

BRIEF DESCRIPTION OF THE DRAWINGS

These and other features and advantages of the present invention will be more fully disclosed in, or rendered obvious by, the following detailed description of the preferred embodiment of the invention, which is to be considered together with the accompanying drawings wherein like numbers refer to like parts and further wherein:

FIG. 20 is a perspective view of the alternative embodiment of feeding bin shown in FIG. 14, with a handle engaged with tabs for manually lifting the bin.

DETAILED DESCRIPTION OF THE PREFERRED EMBODIMENTS

Figure 1:
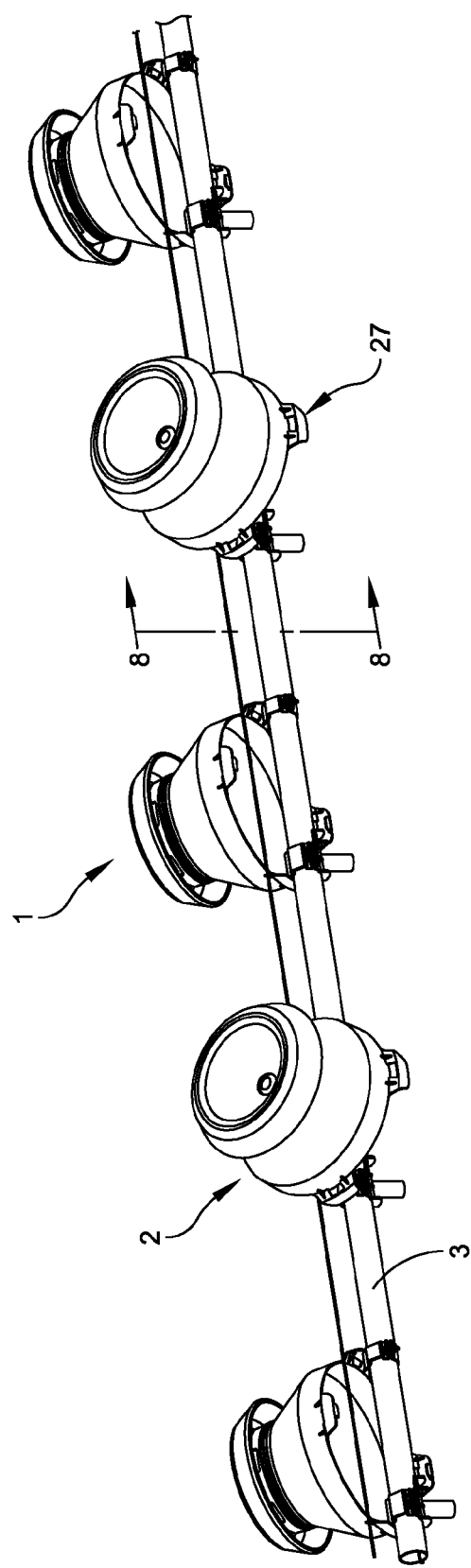
FIG. 1 is a perspective view of a poultry feeder storage system formed in accordance with the invention.
Figure 2:
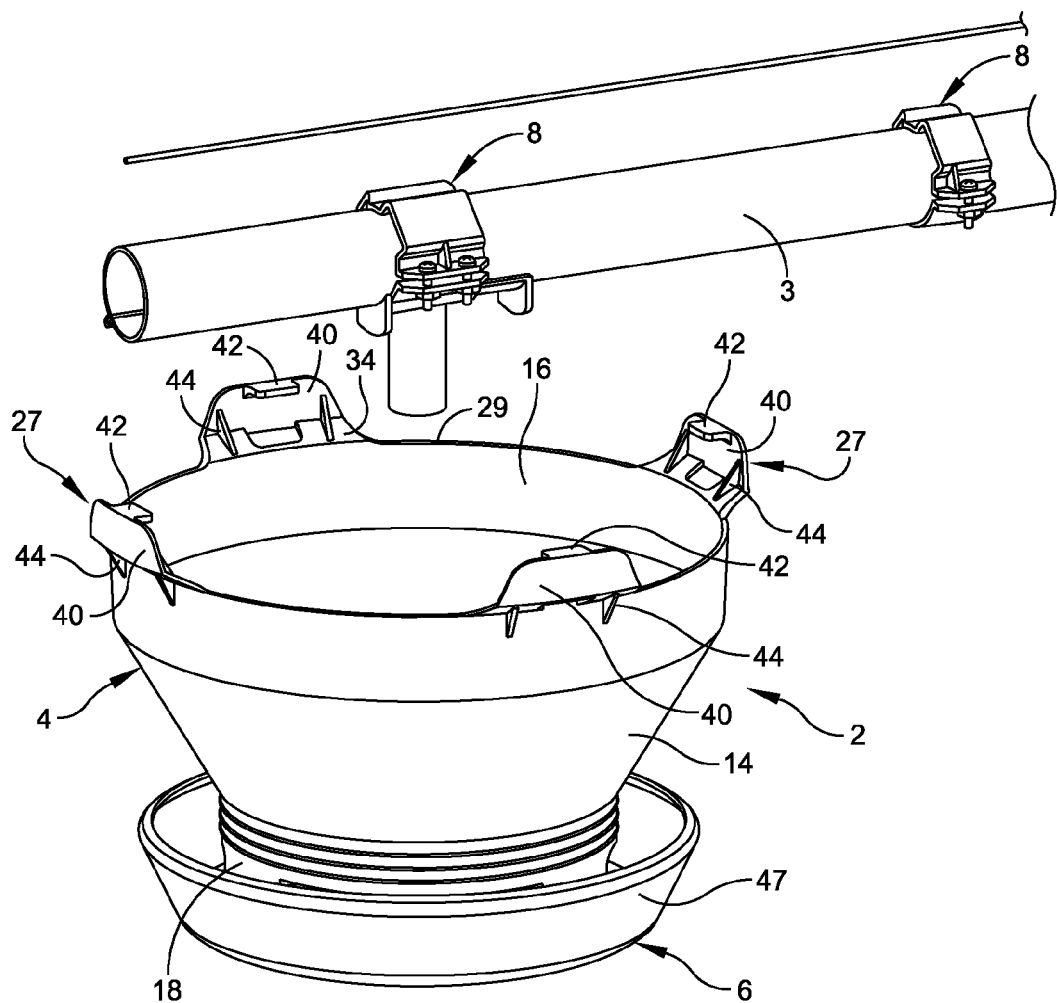
FIG. 2 is a perspective view, partially broken away, of a feeding bin formed in accordance with the invention, adjacent to a conveyor feed tube.

This description of preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In the description, relative terms such as "horizontal," "vertical," "up," "down," "top," and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively or operably connected" is such an attachment, coupling or connection that allows the pertinent structures to operate as intended by virtue of that relationship.

An improved poultry feeding and feeder storage system 1 is provided for on-location storage of a plurality of poultry feeders 2 that provides convenient disposition of individual poultry feeders on the floor of a poultry house. Improved poultry feeding and feeder storage system 1 is most often used in connection with a conventional poultry feeding system that utilizes one or more indoor feed supply hoppers (not shown) that are fluidly coupled to a feed conveyor tube 3 communicating with each hopper.

Figure 5:
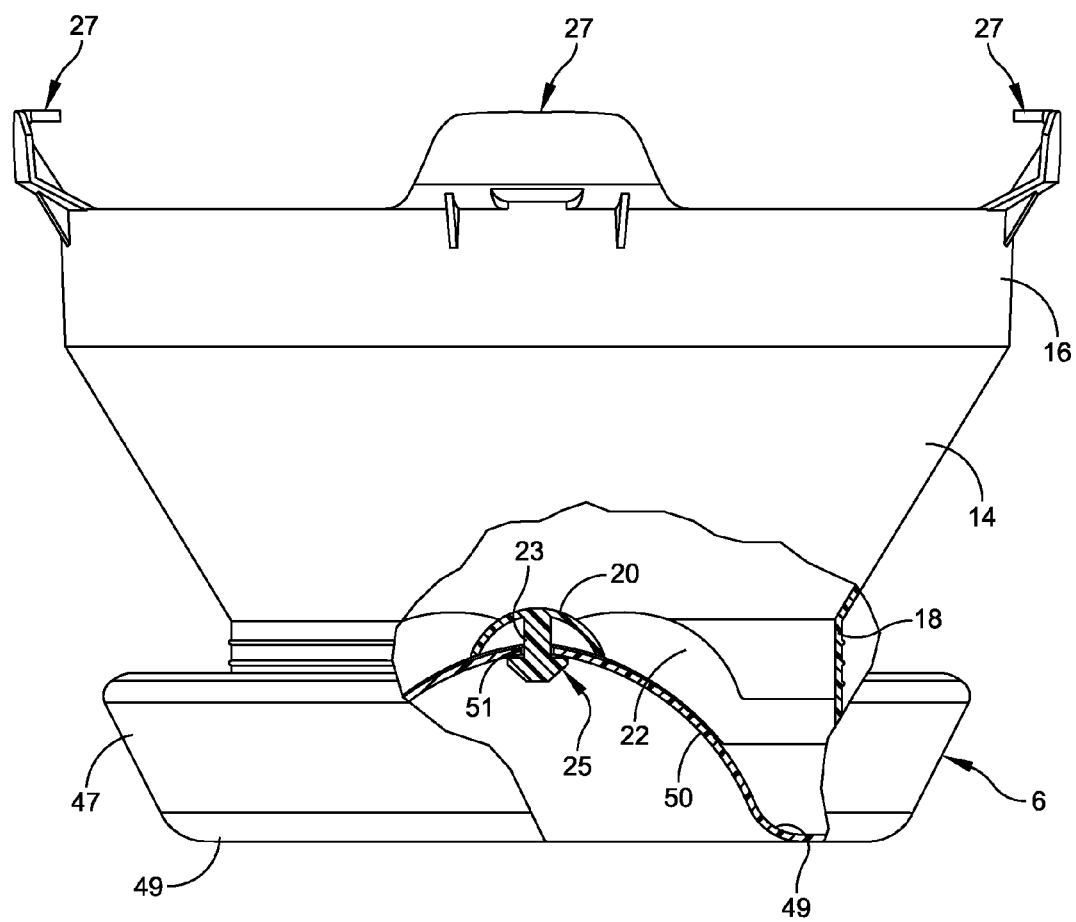
FIG. 5 is a side elevational view, partially broken away and partially in cross section, of the feeding bin shown in FIG. 14.
Figure 6:
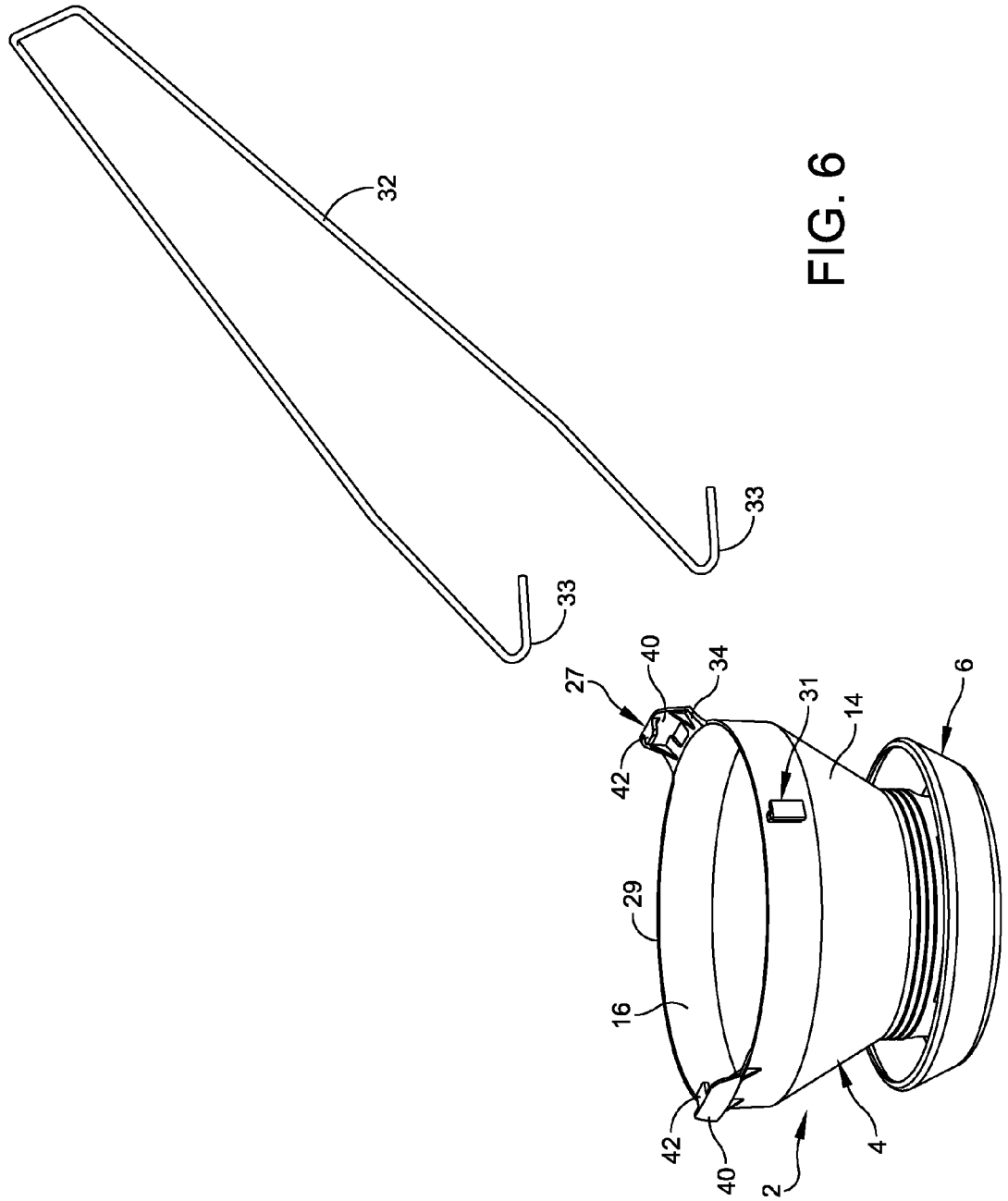
FIG. 6 is a perspective view of an alternative embodiment of feeding bin formed in accordance with the invention, and including a detachable handle.
Figure 7:
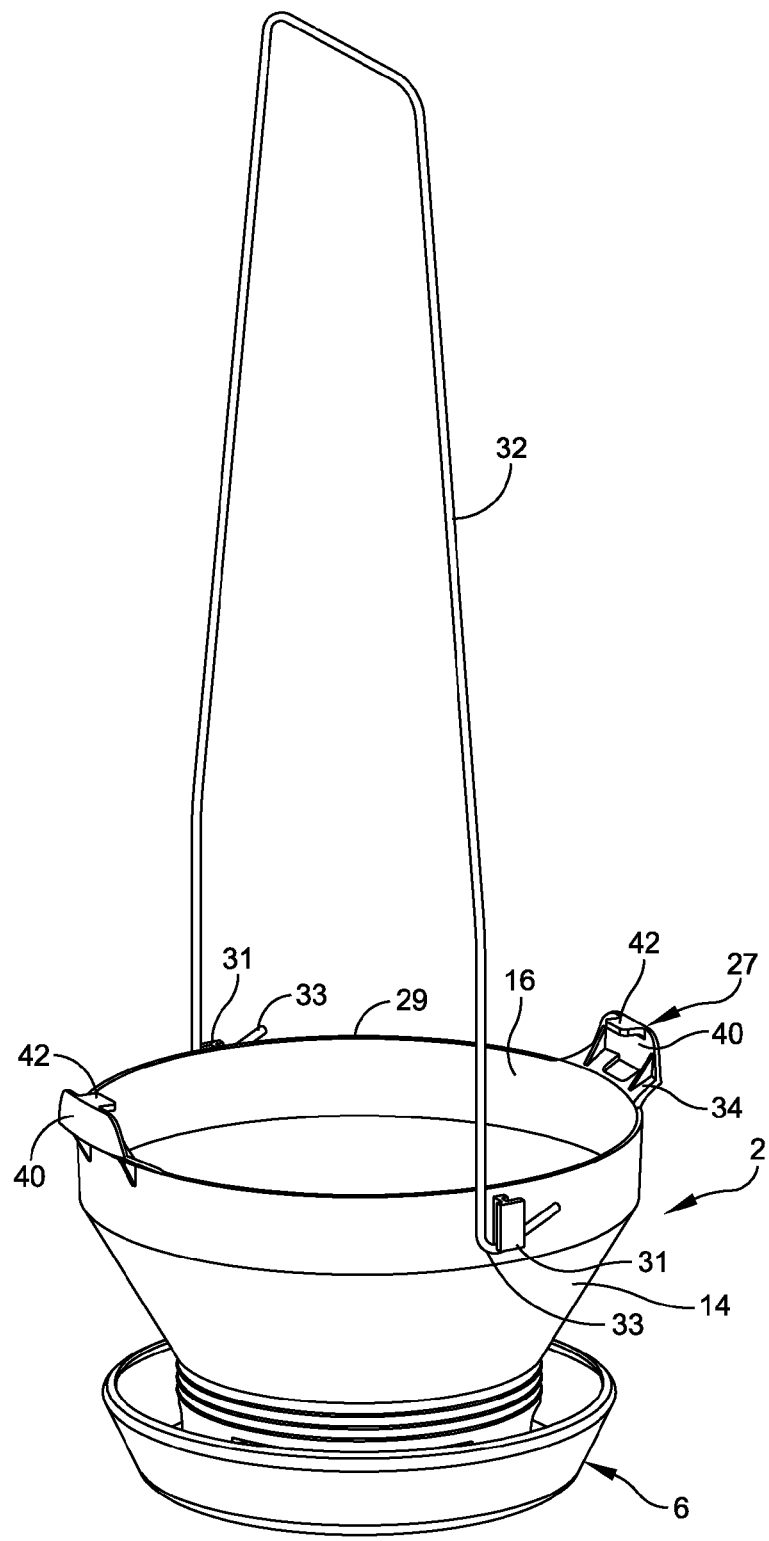
FIG. 7 is an alternative feeding bin similar to FIG. 8 with the detachable handle attached to the feeding bin.
Figure 8:
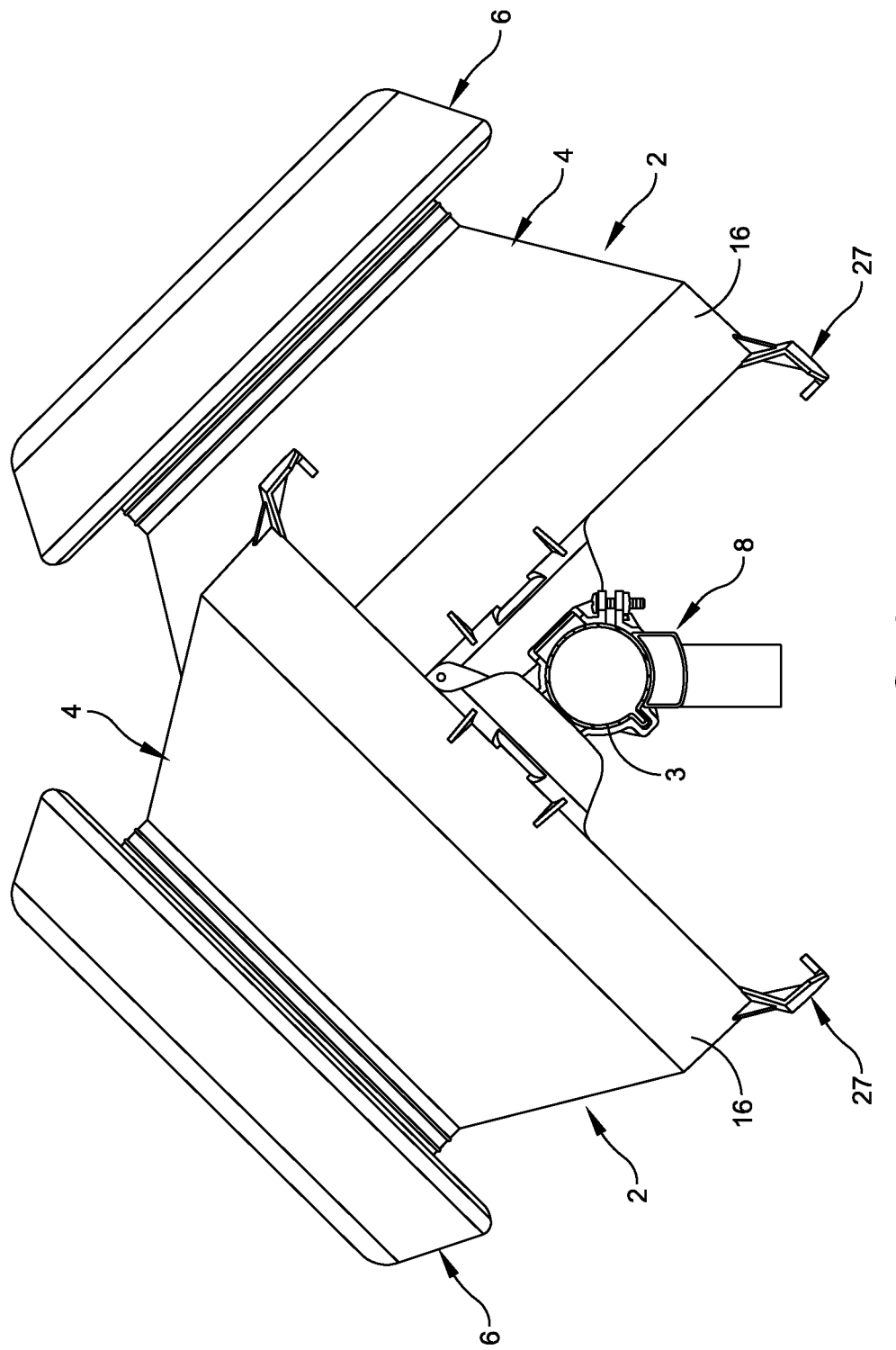
FIG. 8 is an end on perspective view, partially in cross section, of a pair of feeding bins formed in accordance with the invention mounted to a conveyor feed tube similar to that shown in FIG. 1.
Figure 9:
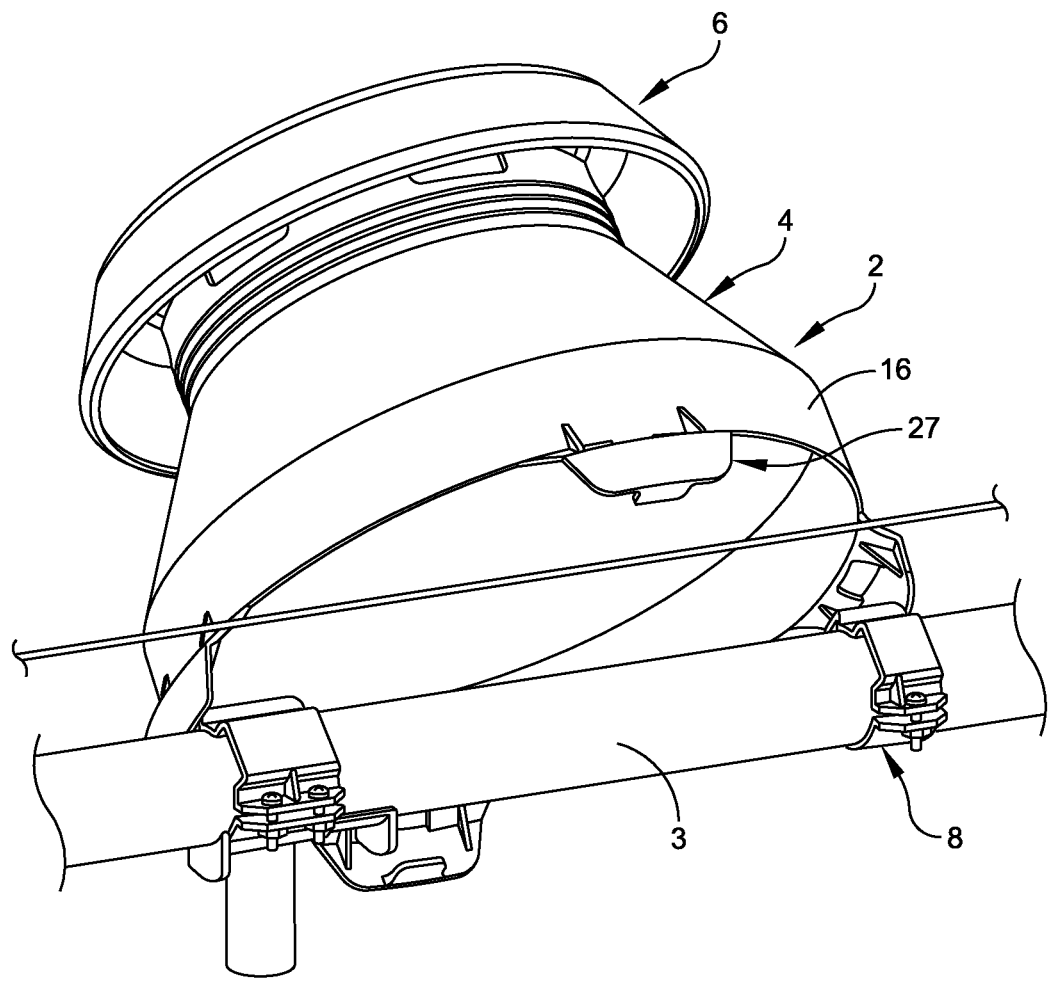
FIG. 9 is a side perspective view, partially broken away, of a feeding bin and conveyor feed tube formed in accordance with the invention.

Referring to FIGS. 1-4, each poultry feeder and system 2 generally includes a bin 4, a pan 6, and a plurality of receivers 8 that are arranged together along feed conveyor tube 3 so as to allow for quick deployment of poultry feeder and system 2 during feeding, while allowing for storage away from the poultry house floor, above their respective deployment sites. More particularly, bin 4 includes a circumferential central frusto-conical wall 14, a cylindrical top wall 16 that projects upwardly from circumferential central frusto-conical wall 14, and a cylindrical bottom wall 18 that projects downwardly from circumferential central frusto-conical wall 14. Advantageously, at least cylindrical top wall 16 of bin 4 is formed so as to be radially resilient, i.e., upon a radially inward application of force, cylindrical wall 16 buckles or deforms, but upon removal of that force, cylindrical top wall 16 springs back to its original shape and size. The lower edge of bottom wall 18 is formed so as to provide a plurality of circumferentially spaced crenels 17 (FIG. 4) that are defined by periodic square edge notches suitable for dispensing feed into pan 6. A hub 20 is suspended within bin 4 by a plurality of circumferentially spaced spokes 22 that extend radially outwardly from the circumference of hub 20 to the interior surface of bottom wall 18. Hub 20 includes a downwardly projecting shaft 23 with a snap-latch 25 projecting outwardly from its free end (FIG. 5). In some embodiments of bin 4, a pair of tabs 31 are located on the outer surface of cylindrical top wall 16 in diametrically opposed relation to one another so as to be available for lifting engagement with a temporary handle 32 (FIGS. 6-7). Handle 32 is often generally U-shaped having tab hooks 33 located on its free ends that are suitable for temporarily engaging tabs 31 for manually lifting each poultry feeder 2 from the floor of the poultry house.

Figure 3:
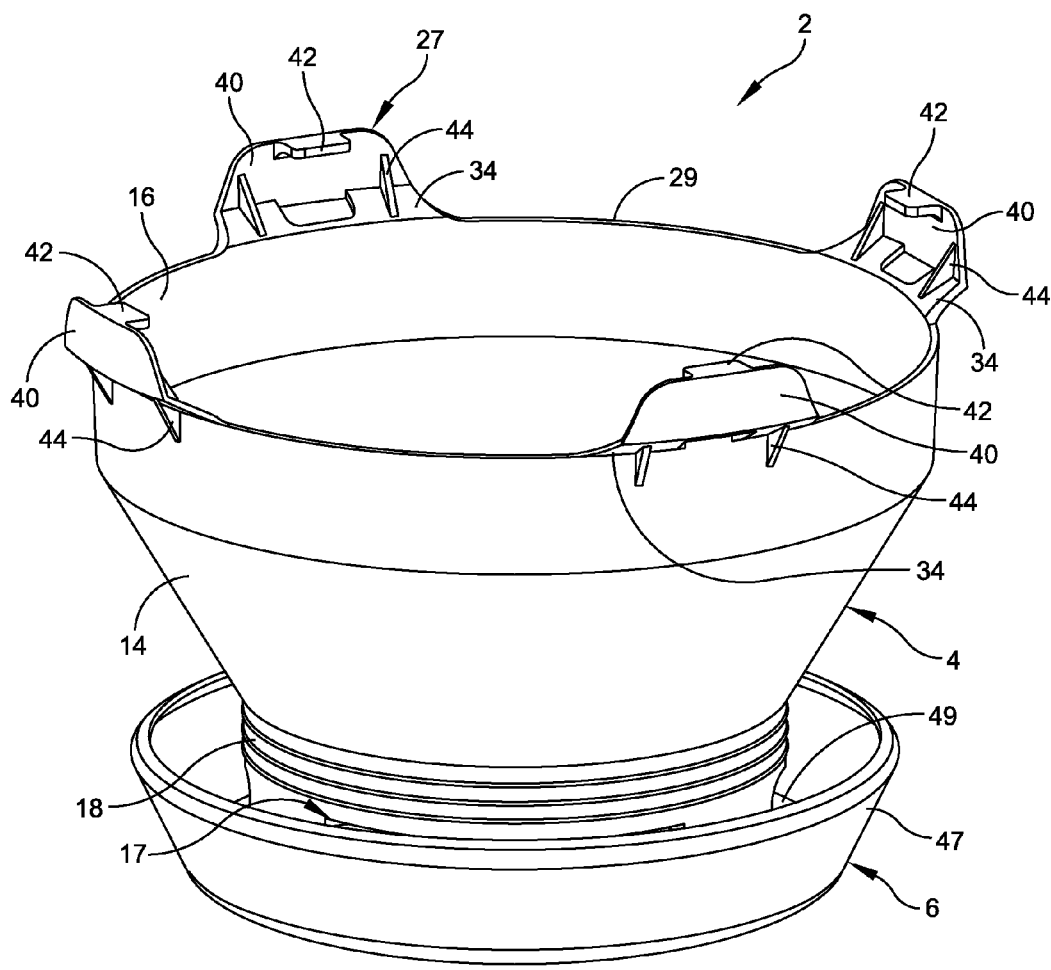
FIG. 3 is a perspective view of a feeding bin.
Figure 4:
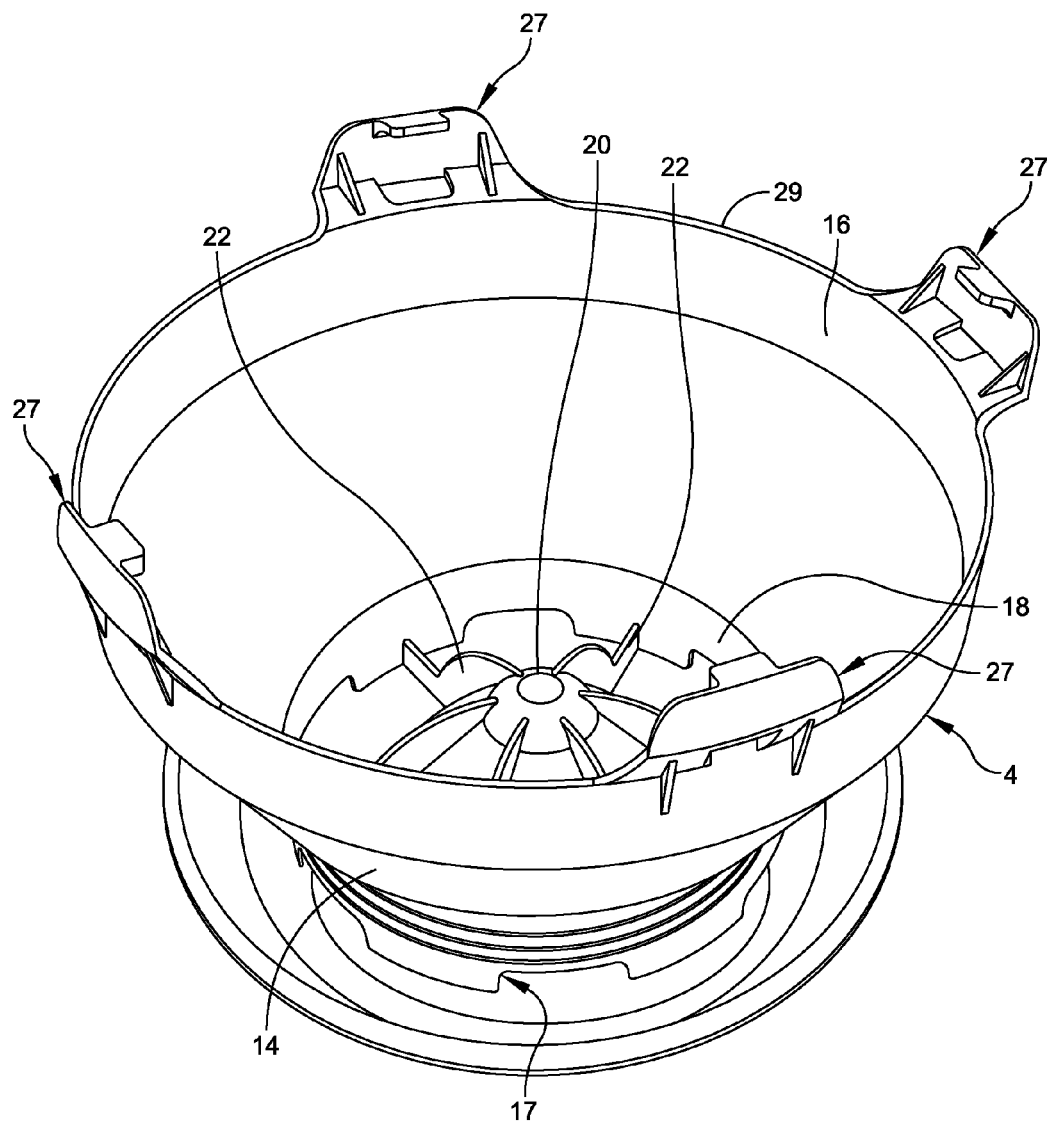
FIG. 4 is a perspective view of the feeding bin shown in FIG. 3 from an angle sufficient to identify structures within the bin.

Referring to FIG. 3, a plurality of latches 27 are located in circumferentially spaced relation to one another on a top edge 29 of cylindrical top wall 16. Each latch 27 includes a stand-off ledge 34 that projects radially outward from top edge 29 of cylindrical top wall 16 and a cantilevered wall 40 that projects upwardly from an outer edge of stand-off ledge 34 (FIGS. 3-6). A latching tongue 42 projects radially inwardly from the top edge of cantilevered wall 40. Struts 44 may also be located between the surfaces of stand-off ledge 34, cantilevered wall 40 and between the surfaces of stand-off 34 and cylindrical top wall 16 so as to provide stiffness to each latch 27.

Figure 5A:
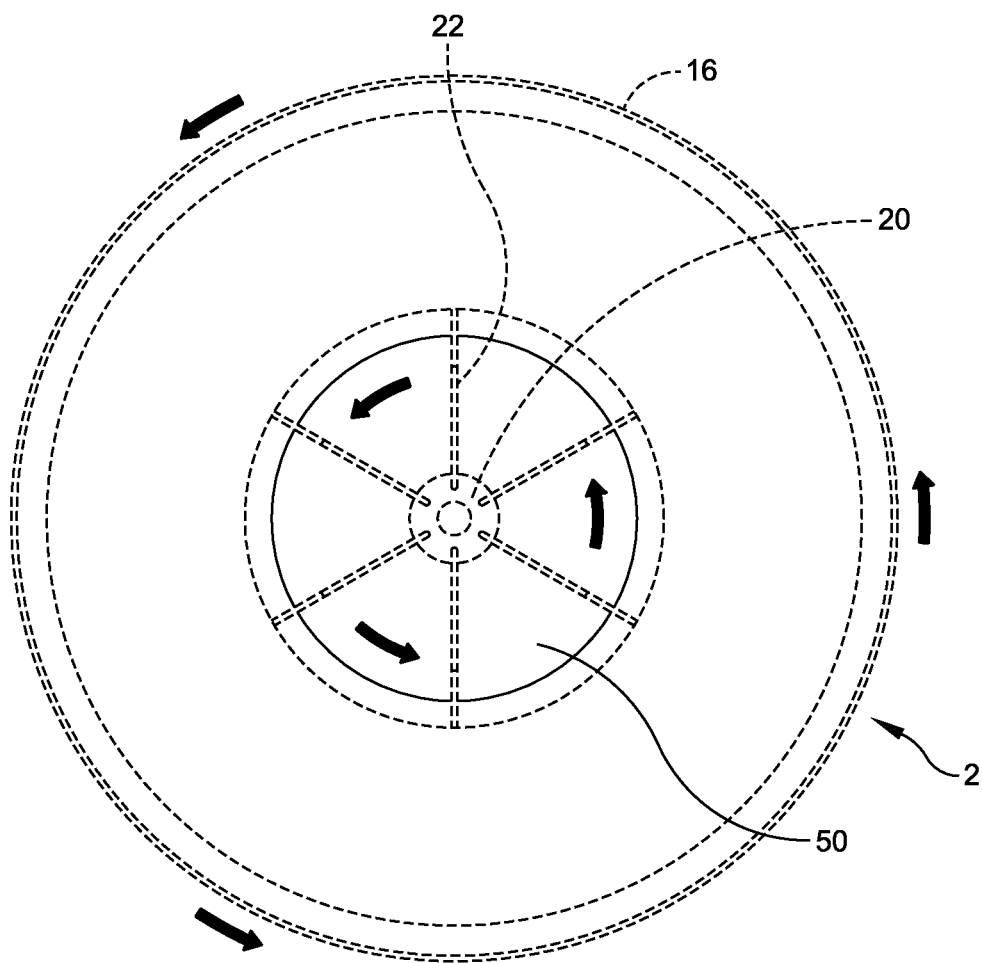
FIG. 5A is a top view of a feeding bin formed in accordance with the invention, shown partially in phantom, and indicating a direction of rotation.

Pan 6 includes a circumferential outer wall 47 that projects upwardly from a peripheral edge of a floor 49 (FIG. 5). A bulge 50 having an apex 51 projects upwardly from the center of floor 49, and inner cylindrical wall 47. A through-bore is defined through bulge 50 at apex 51 that is sized to receive snap-latch 25 such that pan 6 will be free to rotate about shaft 23 (FIG. 5A).

Figure 10:
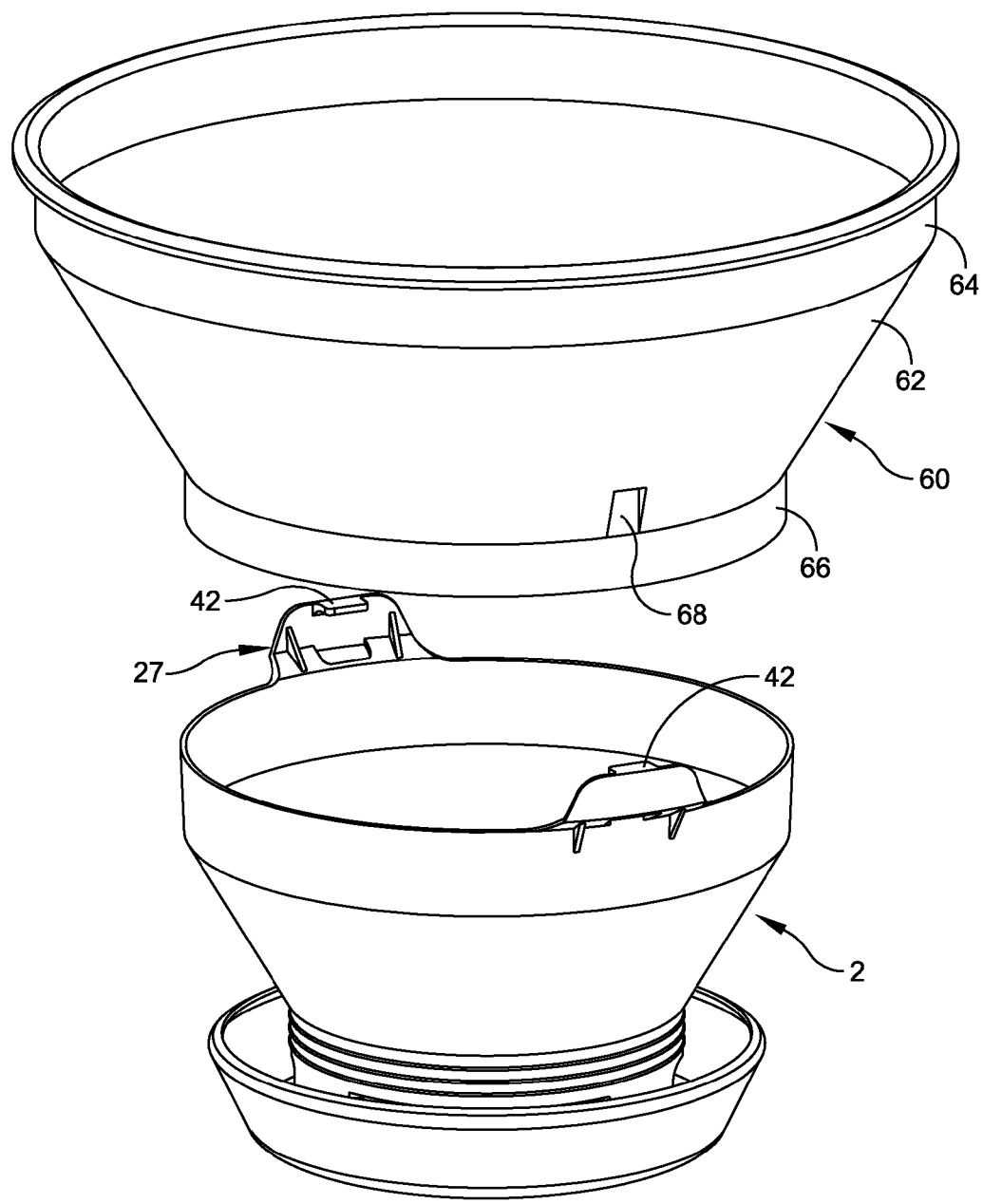
FIG. 10 is a perspective, exploded view of a feeding bin and extension formed in accordance with an alternative embodiment of the invention.
Figure 11:
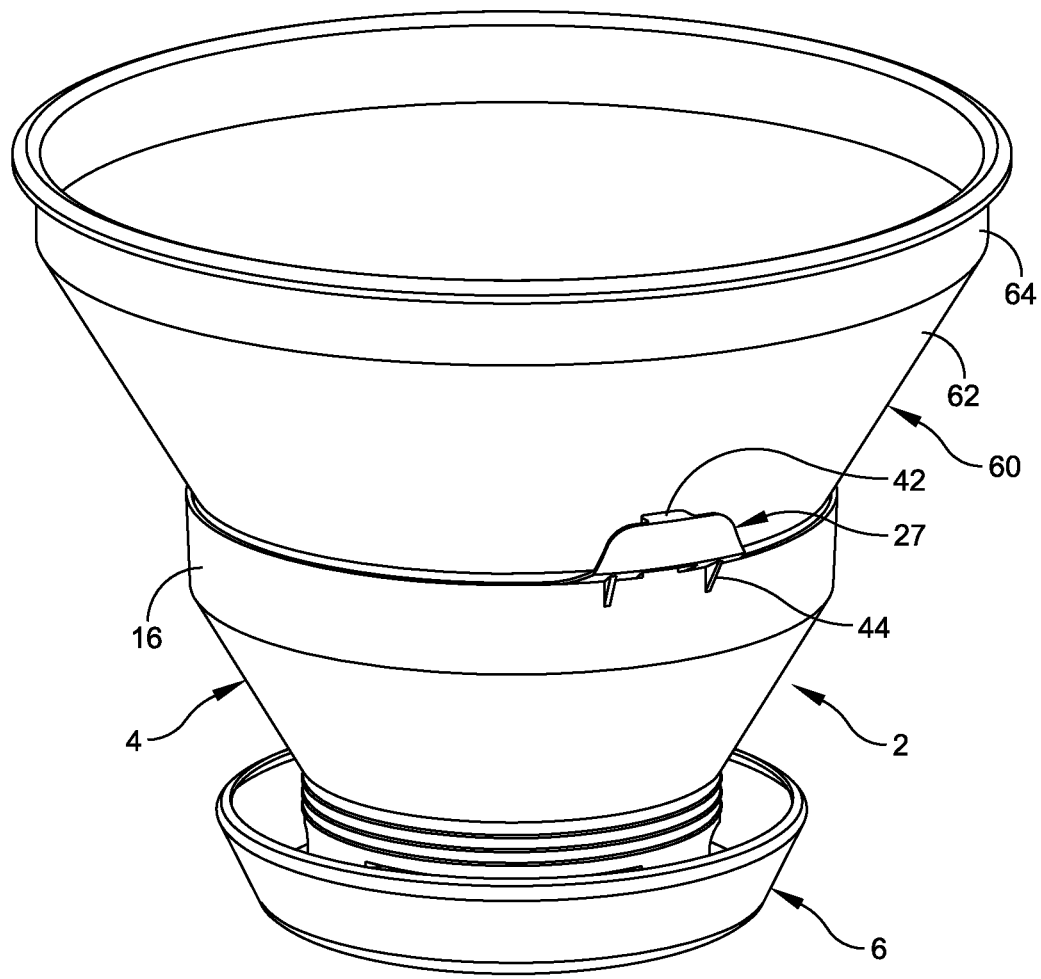
FIG. 11 is a perspective view of the feeding bin and extension shown in FIG. 10.

In some embodiments a bin extension 60 is provided so as to enlarge the volume of feed that may be held in each poultry feeder 2 (FIGS. 10-11). More particularly, bin extension 60 often comprises a circumferential central frusto-conical wall 62, a substantially cylindrical top wall 64 that projects upwardly from circumferential central frusto-conical wall 62, and a cylindrical bottom wall 66 that projects downwardly from circumferential central frusto-conical wall 62. A pair of recessed tabs 68 are located on the outer surface of central frusto-conical wall 62 just adjacent to the top portion of cylindrical bottom wall 66. Recessed tabs 68 are arranged in diametrically opposed relation to one another so as to be available for engagement with correspondingly positioned latching tongues 42.

Figure 12:
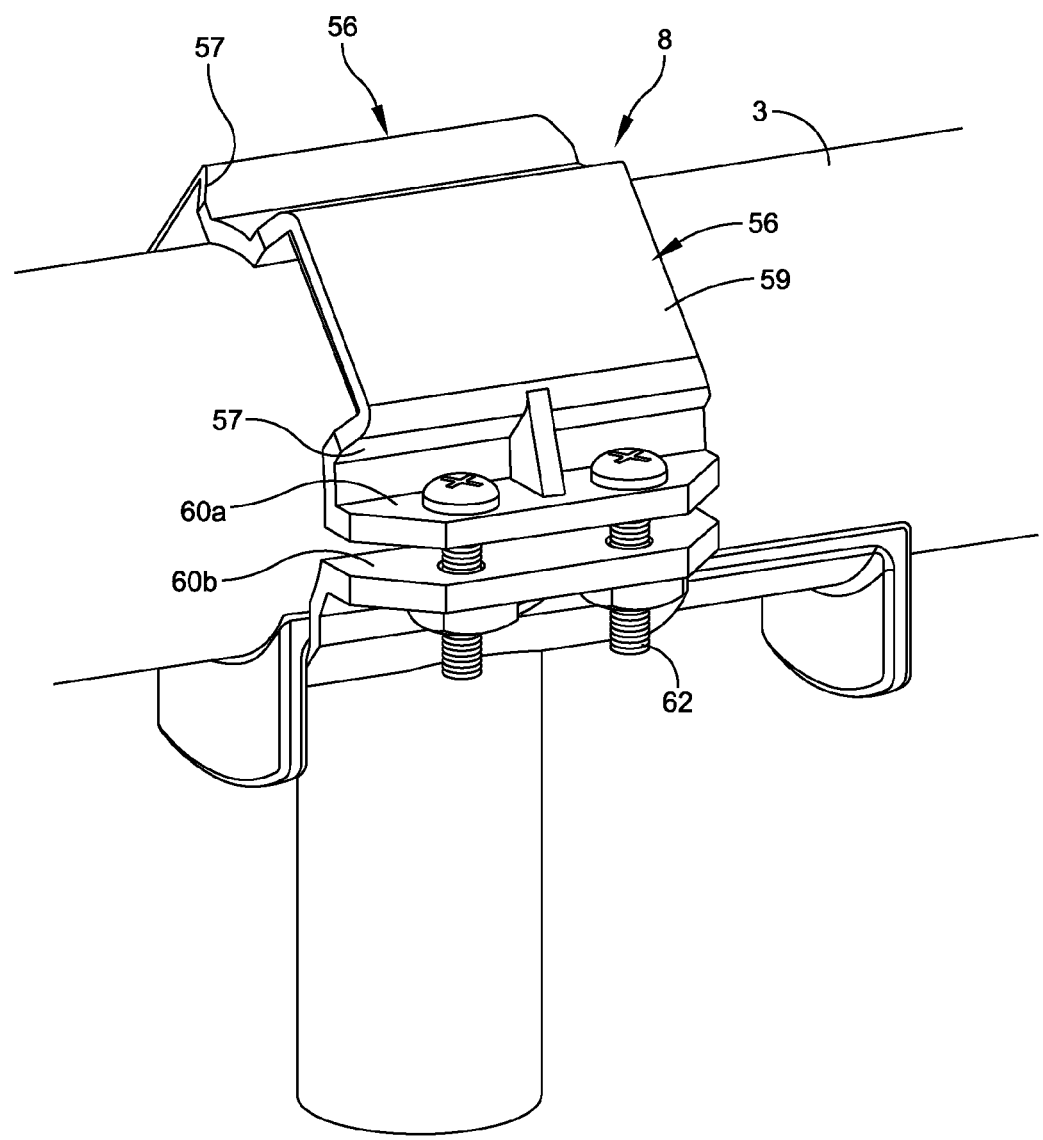
FIG. 12 is a perspective, broken away view of a receiver assembly formed in accordance with the invention.
Figure 13:
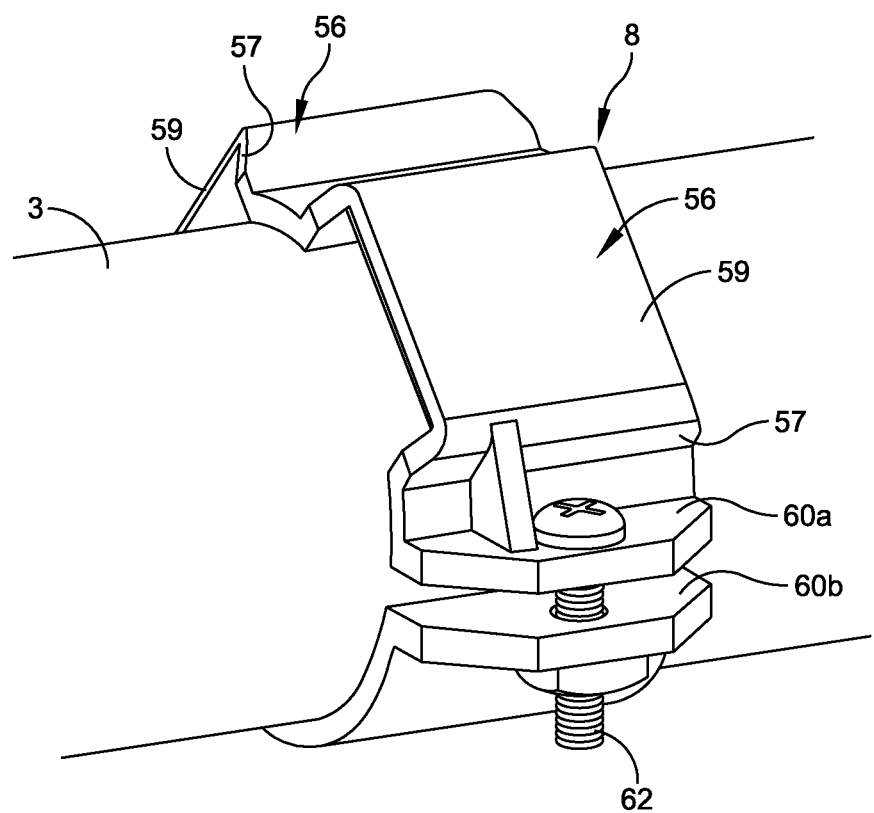
FIG. 13 is a perspective view similar to FIG. 12 showing the opposing side to that shown in FIG. 12.

Referring to FIGS. 12 and 13, each receiver collar 8 comprises a substantially cylindrical non-continuous ring that is sized to wrap around feed conveyor tube 3 of the type well known in the art. One or more receptacle sockets 56 are formed by radially outwardly projecting walls 57 that are spaced apart from one another along the circumference of each receiver collar 8 by a spacer wall 59. A pair of confronting clamp-walls 60a and 60b are located at opposing free ends of each receiver collar 8. A pair of through-bores are defined in each clamp-walls 60a and 60b that are sized and arranged so as to be suitable for receiving one or more threaded clamping bolts 62.

Referring to FIGS. 1-2 and 8-9, feeder and system 2 is assembled to feed conveyor tube 3 as follows. Firstly, a pair of receiver collars 8 are assembled to feed conveyer tube 3 so as to be in adjacent, but spaced-apart relation to one another, with clamp walls 60A and 60B being drawn toward one another by bolts 62 around the tube. Advantageously, receptacle sockets 56 of each receiver collar 8 are arranged in spaced-apart confronting relation with one another, and offset from a vertical axis of conveyer feed tube 3. Next, a handler (not shown) retrieves a bin 4 with a pan 6 rotatingly assembled to it, and places each hand on a diametrically opposed latch 27. Once in this position, the handler exerts a radially inward force so that cylindrical wall 16 buckles and deforms, thereby moving latches 27 toward one another such that the distance between them is narrower than the distance between the adjacent pair of receiver collars 8. Once in this position, deformed bin 4 is moved between pair of receiver collars 8 so that each latching tongue 42 may be slid within a corresponding receptacle socket 56 of one of the pair of receiver collars 8. The handler then removes the radially inward force being applied to latches 27 thereby releasing the walls of bin 4 to spring outwardly thereby causing latching tongues 42 to slide within receptacle sockets 56 of the respective receiver collars 8. Since receptacle sockets 56 of receiver collar 8 are arranged off vertical axis of conveyer feed tube 3 (FIGS. 1, 8, and 9) each bin 4 is located at between 60° and 80° from the vertical axis of conveyor feed tube 3. Since pan 6 is rotatingly assembled to bin 4, if a bird were to light upon the outer bottom surface of any pan 6, the pan would rotate by force of gravity upon the weight of the bird, thereby making its perch unstable and causing it to move from the pan. In this way, birds will be discouraged from perching upon the feed pans while stored, thereby avoiding soiling of the pans with excrement. The ability of pan 6 to freely rotate when assembled to bin 4 provides a significant advantage.

Referring to FIGS. 14-20, an alternative poultry feeder and system 100 generally includes a bin 104, a pan 106, and a plurality of receivers 108 (FIG. 18) that are arranged together along feed conveyor tube 3 (FIG. 19) so as to allow for quick deployment of poultry feeder 100 during feeding, while allowing for storage away from the poultry house floor, above their respective deployment sites. More particularly, bin 104 generally has an hour glass or figure eight shape including a circumferential central wall 114, a top wall 116 that projects upwardly from circumferential central wall 114, and a bottom wall 118 that projects downwardly from circumferential central 114. As a result of the hour glass or figure eight shape, circumferential central wall 114, top wall 116, and a bottom wall 118 together define a relatively narrowed waist region 119 between spaced-apart rounded bin portions. Advantageously, at least cylindrical top wall 116 of bin 104 is formed so as to be radially resilient, i.e., upon a radially inward application of force, cylindrical top wall 116 buckles or deforms, but upon removal of that force, cylindrical top wall 116 springs back to its original shape and size. The lower edge of bottom wall 118 is formed so as to provide a plurality of circumferentially spaced crenels 117 (FIG. 14) that are defined by periodic square edge notches suitable for dispensing feed into pan 106.

Figure 14:
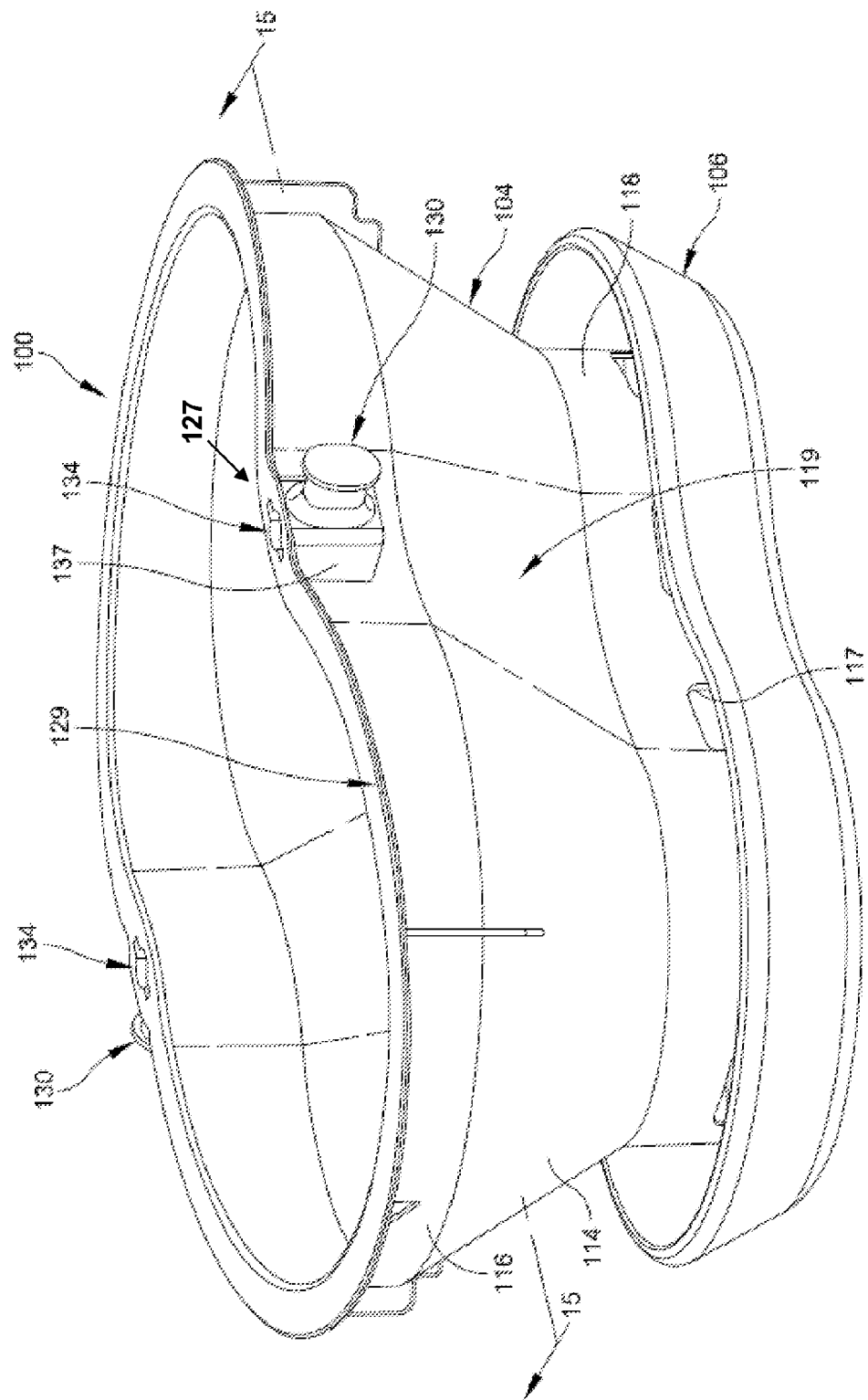
FIG. 14 is a perspective view of a further embodiment of feeding bin formed in accordance with the invention.

Referring to FIG. 14, two latch-locks 127 are located in circumferentially spaced relation to one another at waist 119 and supported by a top ledge 129 of top wall 116. Each latch-lock 127 includes a keyhole 134 that is defined within top ledge 129 of top wall 116 and a handle-tab 130 that projects outwardly from an outer surface of each latch-lock 127. Keyhole 134 has a cruciform profile suitable for receiving a complementarily shaped key 135 (FIG. 17) and is surrounded by a shroud 137 that projects downwardly from the underside of top ledge 129 adjacent to waist 119. Bin 104 also includes a floor wall 140 that bulges upwardly so as to be surrounded by circumferential central wall 114 and bottom wall 118. Floor wall 140 often comprises a figure eight shape that is complementary to the shape of bin 104. A pair of spaced-apart latches 142 each having spaced cantilevers 143 that project downwardly from the underside of floor wall 140, and including lock tabs 144.

Figure 15:
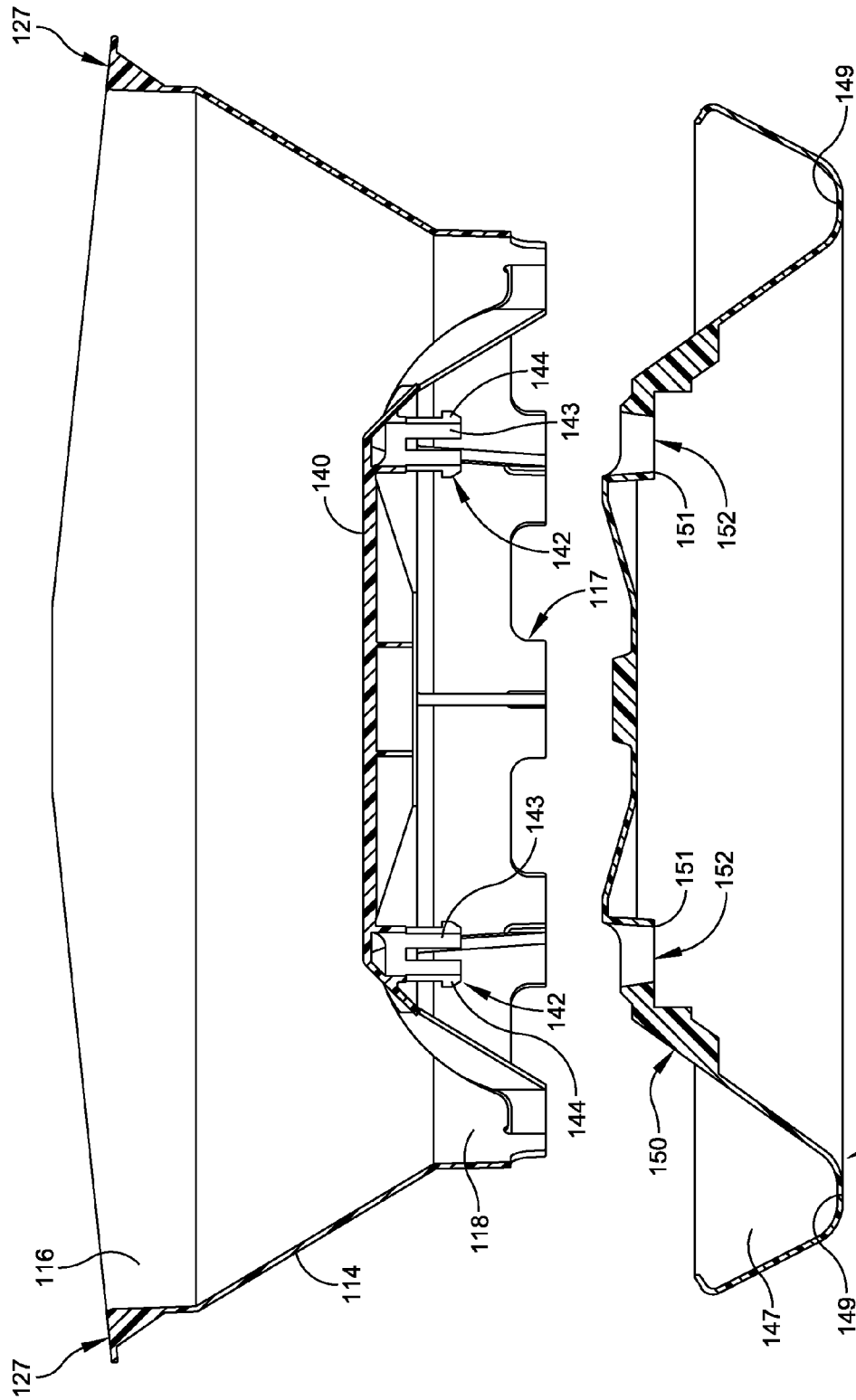
FIG. 15 is an exploded, cross sectional view of the alternative feeding bin shown in FIG. 14.
Figure 16:
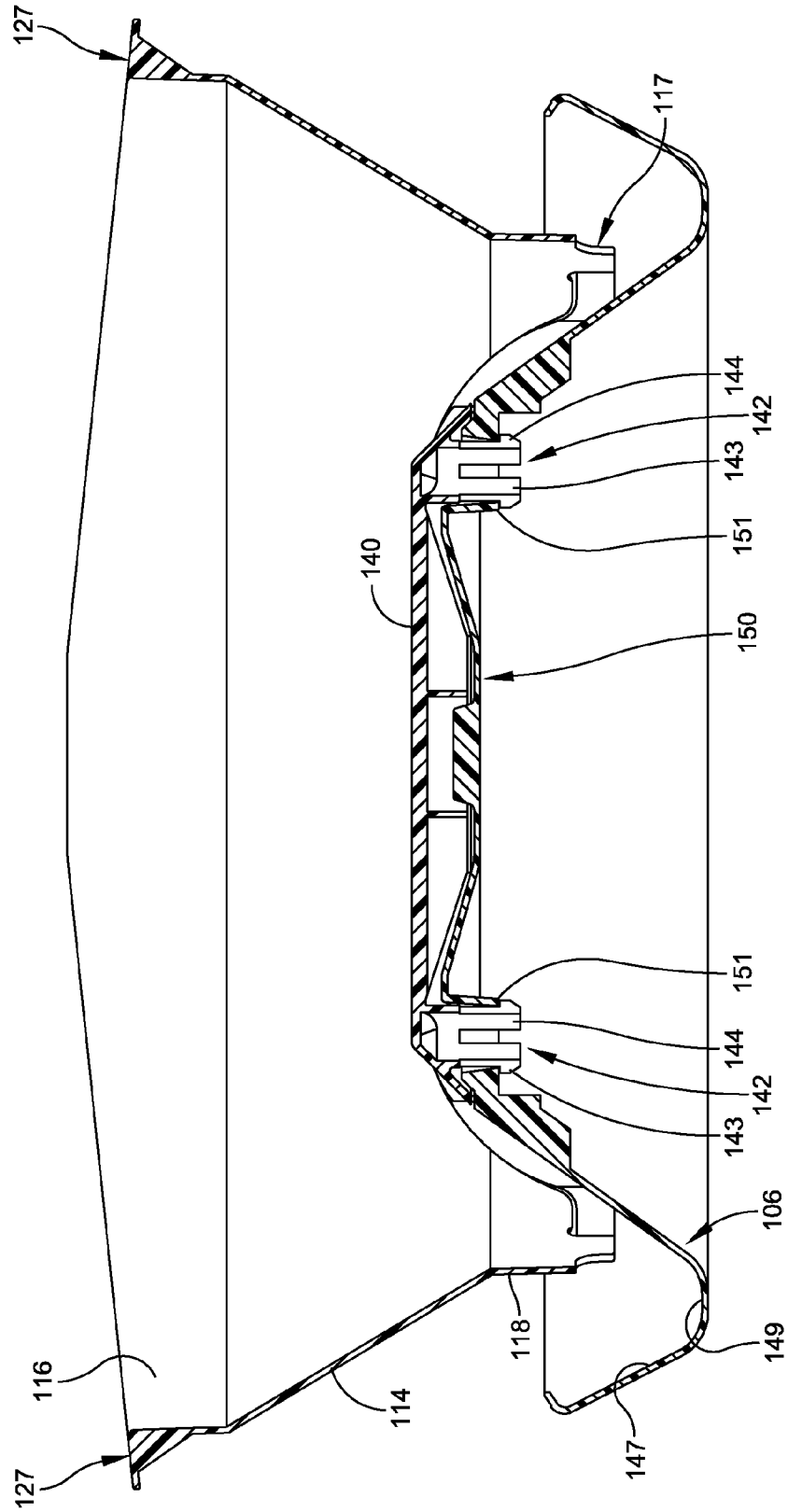
FIG. 16 is a cross sectional view of the feeding bin shown in FIG. 15, assembled to a pan in accordance with the invention.

Pan 106 includes a circumferential outer wall 147 that projects upwardly from a peripheral edge of a feed floor 149 (FIGS. 15-16). A bulge 150 projects upwardly from the center of feed floor 149 and inner cylindrical wall 147. Bulge 150 is complementarily shaped with respect to floor wall 140 of bin 104. A pair of spaced-apart receptacles 152 are defined in spaced-apart relation to one another and complementary relation to spaced-apart latches 142 of floor wall 140. Receptacles 152 are sized and positioned so as to receive latches 142 when pan 106 is assembled to bin 104. In this way, lock tabs 144 slidingly engage the inner surfaces of receptacles 152, thereby deflecting cantilevers 143 inwardly until tabs 144 move past the bottom edge 151 of each receptacle 152. Once in this position, each cantilever 143 springs outwardly so as to lock each tab 144 against a corresponding bottom edge 151.

Figure 17:
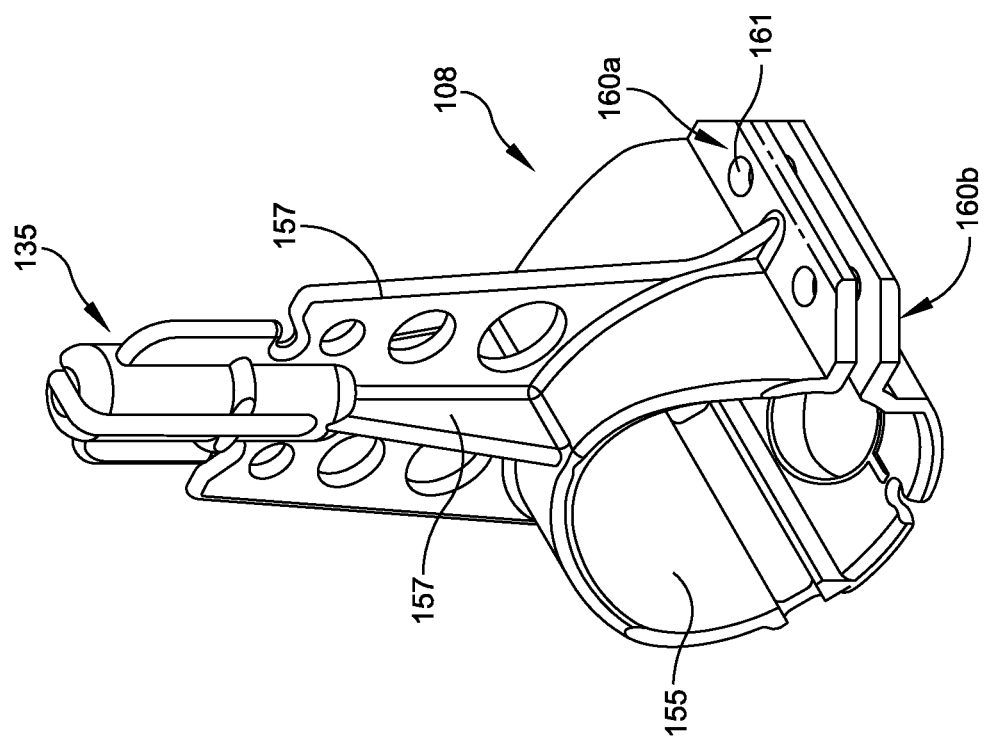
FIG. 17 is a perspective view of an alternative receiver including a cruciform key.
Figure 18:
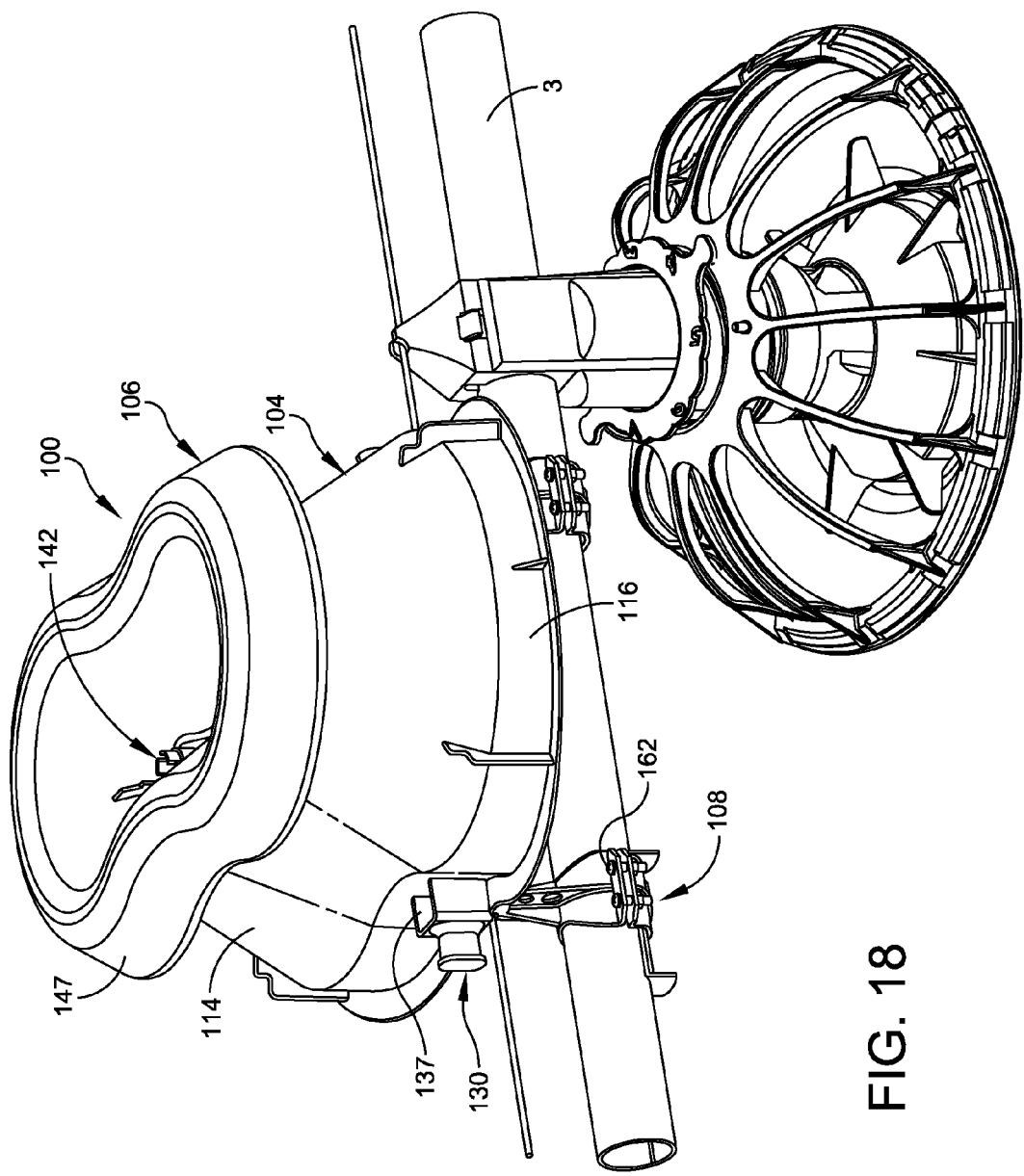
FIG. 18 is a perspective, broken away view of a conveyor feed tube having an alternative embodiment of feeding bin positioned above the tube with the cruciform key of the receiver located within corresponding complementary keyholes in the feeding bin.

Referring to FIGS. 17 and 18, each receiver 108 comprises a substantially cylindrical non-continuous ring 155 that is sized to wrap around feed conveyor tube 3 of the type well known in the art. A cruciform key 135 projects upwardly from non-continuous ring 155, and is structurally supported in an upright position on non-continuous ring 155 by braces 157. A pair of confronting clamp-walls 160a and 160b are located at opposing free ends of non-continuous ring 155. A pair of threaded through-bores 161 are defined in each clamp-walls 160a and 160b that are sized and arranged so as to be suitable for receiving one or more threaded clamping bolts 162.

Figure 19:
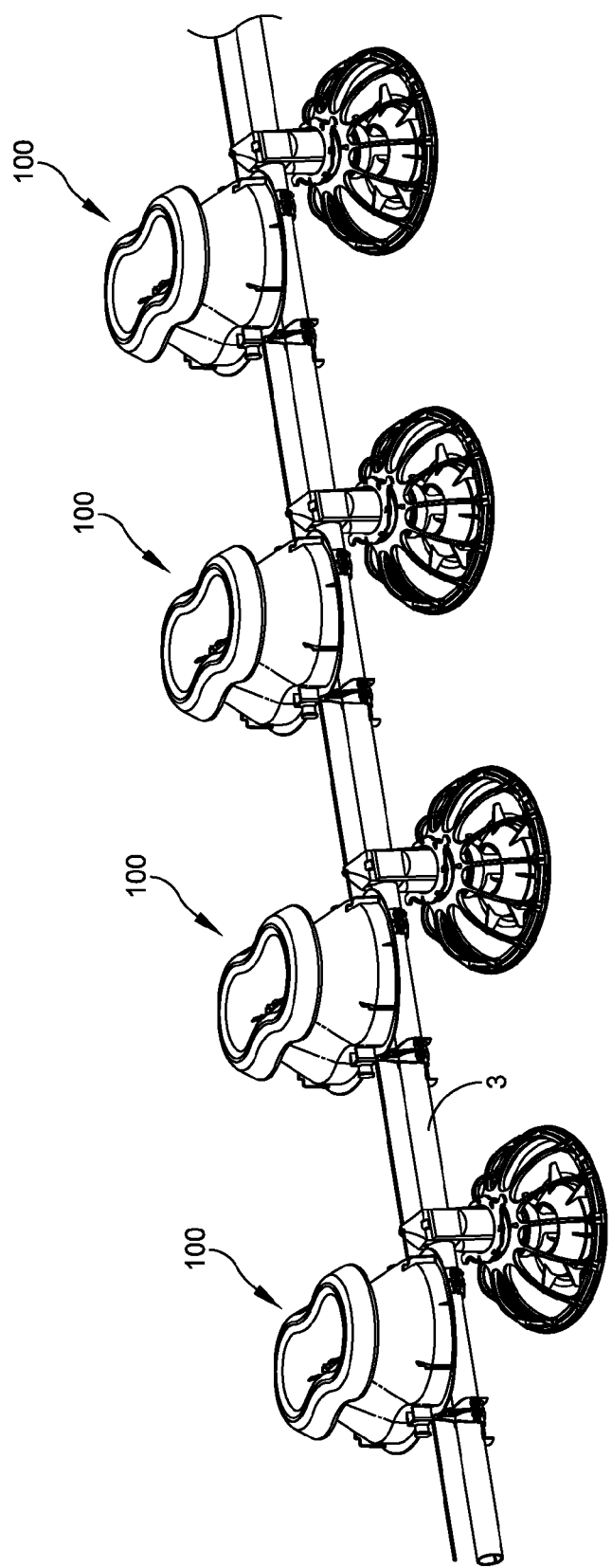
FIG. 19 is a perspective, broken away view of a plurality of feeding bins formed in accordance with the invention.

Referring to FIGS. 18 and 19, feeder and system 100 is assembled to feed conveyor tube 3 as follows. Firstly, a pair of receiver collars 108 are assembled to feed conveyer tube 3 so as to be in adjacent, but spaced-apart relation to one another, with clamp walls 160A and 160B being drawn toward one another by bolts 62 around the tube. Advantageously, cruciform keys 135 of each receiver collar 108 are arranged in spaced-apart confronting relation with one another. Next, a handler (not shown) retrieves a bin 104 and places it above conveyor feed tube 3 so that key holes 134 of latch-locks 127 are arranged in aligned, coaxial relation with corresponding keys 135 projecting upwardly from each receiver collar 108. Once in this position, the handler lowers bin 104 so that each key 135 enters it corresponding key hole 134. Bin 104 is now arranged on conveyor 3.

While the foregoing description and drawings represent preferred or exemplary embodiments of the present invention, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes and/or control logic as applicable described herein may be made without departing from the spirit of the invention. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. A poultry feeder storage system comprising:
   a feed conveyor tube; and
   at least one feeder including a pan rotatingly assembled to a radially resilient bin, said bin including a plurality of latches located in circumferentially spaced relation to one another on an edge of said bin;
   at least two receiver collars fastened in longitudinally spaced-apart relation to one another around said feed conveyor tube such that said radially resilient bin may be (i) deformed radially inwardly so that at least two opposing latches are arranged so as to be releaseably coupled to said receiver collars, and (ii) released so as to spring outwardly thereby causing said latches to engage said receiver collars.

2. A poultry feeder storage system according to claim 1 wherein said bin includes a circumferential central frusto-conical wall, a cylindrical top wall that projects upwardly from said circumferential central frusto-conical wall, and a cylindrical bottom wall that projects downwardly from said circumferential central frusto-conical wall.

3. A poultry feeder storage system according to claim 2 wherein said bin a lower edge of said bottom wall is formed so as to provide a plurality of circumferentially spaced crenels that define a plurality of periodic notches suitable for dispensing feed into said pan.

4. A poultry feeder storage system according to claim 3 wherein said bin includes a hub suspended within an interior space of said bin by a plurality of circumferentially spaced spokes that extend radially outwardly from the circumference of said hub to an interior surface of said bottom wall and further including a downwardly projecting shaft having a snap-latch projecting outwardly from a free end.

5. A poultry feeder storage system according to claim 2 wherein said bin includes a pair of tabs located on an outer surface of said cylindrical top wall in diametrically opposed relation to one another so as to be available for lifting engagement with a handle.

6. A poultry feeder storage system according to claim 2 wherein each said latch includes a stand-off ledge that projects radially outwardly from a top edge of said cylindrical top wall and a cantilevered wall that projects upwardly from an outer edge of said stand-off ledge.

7. A poultry feeder storage system according to claim 6 wherein each said latch includes a latching tongue that projects radially inwardly from said top edge of said cantilevered wall.

8. A poultry feeder storage system according to claim 2 wherein said pan includes a circumferential outer wall that projects upwardly from a peripheral edge of a floor defined by a bulge having an apex projecting upwardly from its center with a through-bore defined through said bulge at said apex being sized to receive a snap-latch having a shaft such that said pan will be free to rotate about said shaft.

9. A poultry feeder storage system according to claim 2 further including a releasable bin extension provided so as to enlarge the volume of feed that may be held within each said bin.

10. A poultry feeder storage system according to claim 1 wherein each said receiver collar comprises a substantially cylindrical non-continuous ring that is sized to wrap around said feed conveyor tube and including at least one receptacle socket formed by radially outwardly projecting walls that are spaced apart from one another along the circumference of each said receiver collar by a spacer wall.

11. A poultry feeder storage system comprising:
    a feed conveyor tube; and
    at least one feeder including a pan assembled to a bin wherein said bin and said pan have a figure eight cross-sectional profile so as to define a central waist, and two latch-locks located in circumferentially spaced relation to one another on an edge of said central waist of said bin, each of said latch-locks comprising a key hole;
    at least two receiver collars fastened in longitudinally spaced-apart relation to one another around said feed conveyor tube and each including of a key projecting upwardly relative to said feed conveyor tube such that said bin may be (i) positioned atop said at least two receiver collars so that said key is located within said key hole.

12. A poultry feeder storage system according to claim 11 wherein said bin comprises a circumferential central wall, a top wall that projects upwardly from said circumferential central wall, and a bottom wall that projects downwardly from said circumferential central.

13. A poultry feeder storage system according to claim 12 wherein a lower edge of said bottom wall is formed so as to provide a plurality of circumferentially spaced crenels that are defined by periodic notches suitable for dispensing feed into said pan.

14. A poultry feeder storage system according to claim 12 wherein said two latch-locks are located in circumferentially spaced relation to one another at waist and supported by a top ledge of said top wall with said keyhole defined within said top ledge.

15. A poultry feeder storage system according to claim 14 wherein said keyhole has a cruciform profile suitable for receiving a complementarily shaped key.

16. A poultry feeder storage system according to claim 15 wherein said bin includes a floor wall that bulges upwardly so as to be surrounded by said circumferential central wall and said bottom wall such that said floor wall comprises a figure eight shape that is complementary to the shape of said bin.

17. A poultry feeder storage system according to claim 16 further including a pair of spaced-apart latches each having spaced cantilevers that project downwardly from an underside of said floor wall and a lock tabs.

18. A poultry feeder storage system according to claim 17 wherein said pan includes a circumferential outer wall that projects upwardly from a peripheral edge of said feed floor with a bulge that projects upwardly from a center of said feed floor wherein said bulge is complementarily shaped with respect to said floor wall of said bin and a pair of spaced-apart receptacles are defined in spaced-apart relation to one another and complementary relation to said spaced-apart latches of said floor wall.

19. A poultry feeder storage system according to claim 18 wherein said receptacles are sized and positioned so as to receive said latches when said pan is assembled to said bin.

* * * * *